(12) United States Patent
Huang et al.

(10) Patent No.: US 11,056,782 B2
(45) Date of Patent: Jul. 6, 2021

(54) LINKED LOCKING MECHANISM AND ANTENNA DOWN-TILT ANGLE CONTROL DEVICE

(71) Applicant: Comba Telecom Technology (Guangzhou) Limited, Guangdong (CN)

(72) Inventors: Chaosheng Huang, Guangdong (CN); Zefeng Ma, Guangdong (CN); Fengzhang Xue, Guangdong (CN); Jianjun You, Guangdong (CN); Hongbin Duan, Guangdong (CN); Peitao Liu, Guangdong (CN)

(73) Assignee: Comba Telecom Technology (Guangzhou) Limited

( * ) Notice: Subject to any disclaimer, the term of this patent is extended or adjusted under 35 U.S.C. 154(b) by 0 days.

(21) Appl. No.: 16/649,421

(22) PCT Filed: Aug. 29, 2018

(86) PCT No.: PCT/CN2018/103005
§ 371 (c)(1),
(2) Date: Mar. 20, 2020

(87) PCT Pub. No.: WO2019/056934
PCT Pub. Date: Mar. 28, 2019

(65) Prior Publication Data
US 2020/0303816 A1 Sep. 24, 2020

(30) Foreign Application Priority Data
Sep. 22, 2017 (CN) .......................... 201710867596.9

(51) Int. Cl.
*H01Q 3/04* (2006.01)
*F16H 3/08* (2006.01)
*H01Q 1/12* (2006.01)

(52) U.S. Cl.
CPC ................. *H01Q 3/04* (2013.01); *F16H 3/08* (2013.01); *H01Q 1/125* (2013.01)

(58) Field of Classification Search
CPC .. H01Q 3/04; H01Q 1/125; F16H 3/08; F16H 3/60; F16H 3/70
See application file for complete search history.

(56) References Cited

U.S. PATENT DOCUMENTS 9,972,906 B2 * 5/2018 Vassilakis ................ H01Q 3/08
2019/0027825 A1 1/2019 Fang et al.

FOREIGN PATENT DOCUMENTS

CN 105508518 A 4/2016
CN 105514610 A 4/2016
(Continued)

OTHER PUBLICATIONS

International Search Report for PCT/CN2018/103005 dated Nov. 21, 2018, 2 pages.

*Primary Examiner* — Seung H Lee
(74) *Attorney, Agent, or Firm* — Lerner, David, Littenberg, Krumholz & Mentlik, LLP (57) ABSTRACT

A linked locking mechanism and antenna down-tilt angle control device is described. Linked locking mechanism includes: mounting frame with a mounting positions, each mounting position has a mounting through hole and a clamping body. Output assembly includes an output shaft and output gear resiliently disposed on output shaft. One end of output gear has engaging body engaged with clamping body and pressing body provided through mounting through hole. Rotating bracket has pressure bearing surface pressed against pressing body. Arc-shaped embossments are provided on pressure bearing surface. The arc-shaped embossment includes guide end, anti-reverse end, and mating body. When mating body and pressing body abut, and engaging body and clamping body are separated, output gear drives (Continued)

output shaft to rotate. Linked locking mechanism and antenna down-tilt angle control device provide easy positioning and accurate control of down-tilt angle of antenna.

13 Claims, 10 Drawing Sheets

(56) References Cited

FOREIGN PATENT DOCUMENTS

| | | | |
|---|---|---|---|
| CN | 106838149 A | 6/2017 | |
| CN | 107658566 A | 2/2018 | |
| CN | 207353472 U | 5/2018 | |
| EP | 3584882 A1 | 12/2019 | |
| WO | WQ-2007107051 A1 * | 9/2007 | ............... H01Q 3/02 |

* cited by examiner

LINKED LOCKING MECHANISM AND ANTENNA DOWN-TILT ANGLE CONTROL DEVICE

CROSS-REFERENCE TO RELATED APPLICATIONS

The present application is a national phase entry under 35 U.S.C § 371 of International Application No. PCT/CN2018/103005 filed Aug. 29, 2018, which claims priority from Chinese Application No. 201710867596.9 filed Sep. 22, 2017, all of which are hereby incorporated herein by reference.

FIELD OF THE INVENTION

The present invention relates to the technical field of mobile communication devices, and in particular, to a linked locking mechanism and antenna down-tilt angle control device.

BACKGROUND OF THE INVENTION

As the number of mobile communication terminal users continues to increase, the network capacity requirements of sites in a mobile cellular network are increasing, and at the same time, the interference between different sites or even between different sectors of the same site is required to be minimized, that is to maximize network capacity and minimize interference. To achieve this object, an antenna beam down-tilt on a drive station is usually used.

At present, the method of driving a beam down-tilt includes: mechanical down-tilt and electronic down-tilt, and electronic down-tilt has obvious advantages, which is the current mainstream and future development trend. The structure of transmission of a traditional electronic down-tilt is complicated, and the positioning function is insufficient.

SUMMARY OF THE INVENTION

Based on this, it is necessary to provide a linked locking mechanism and antenna down-tilt angle control device. It is easy to locate and enables independent and accurate control of the down-tilt angle of two or more beam antennas.

The technical scheme is as follows:

A linked locking mechanism, includes:

a mounting frame which is provided with at least two mounting positions, each mounting position is provided with a mounting through hole and a clamping body provided along an outer circumferential direction of the mounting through hole, all the mounting through holes are spaced along a same circumferential direction;

an output assembly corresponding to a respective mounting position, the output assembly includes an output shaft and an output gear which is resiliently disposed on the output shaft, one end of the output gear is provided with an engaging body engaged with the clamping body and a pressing body provided through the mounting through hole, the engaging body is disposed outside the pressing body; and a rotating bracket, which can be rotated relative to the mounting frame, the rotating bracket is provided with a pressure bearing surface that is pressed against the pressing body and at least two arc-shaped embossments provided on the pressure bearing surface, all the arc-shaped embossments are spaced along a same circumferential direction, the arc-shaped embossment includes a guide end, an anti-reverse end, and a mating body provided between the guide end and the anti-reverse end, only when the mating body and the pressing body abut, and the engaging body and the clamping body are separated from each other, the output gear can drive the output shaft to rotate.

The above-mentioned linked locking mechanism is applied to an antenna down-tilt angle control device. Anti-rotation structure formed by the arc-shaped embossment and the pressing body of the rotating bracket is used. A planetary gear mechanism and one-way control mechanism at the same time is used. The rotating bracket is a planetary carrier and can only rotate in one direction. At the same time, the arc-shaped embossment is used to cooperate with the pressing body of the output gear to realize the engagement and separation of the clamping body and the engaging body, enabling the output gear to be self-locked or unlocked. Specifically, when a certain output gear needs to be driven to rotate, the rotating bracket is controlled to rotate to a corresponding position, so that the pressing body is pressed against the mating body, and the engaging body and the clamping body are separated to unlock a corresponding output gear of the antenna. At this time, the output gear can be driven to rotate, which in turn drives the output shaft to rotate. The output shaft is used to output power and adjust the down-tilt angle of the antenna. During this process, the remaining output gears are locked, and the pressing body of at least one output gear and the anti-reverse end of one of the arc-shaped embossments cooperate with each other in an anti-reverse manner. Furthermore, during the driving process, the other output gears are not affected, and one-to-one driving is achieved. At the same time, the meshing of the output gears and input gears is more precise. The linked locking mechanism adopts an integrated structure, and uses the output gear and the anti-reverse end as a positioning reference to improve the gear meshing accuracy, which can improve the control accuracy of the downward tilt adjustment of two or more beam antennas.

The technical solution is further described below.

In one embodiment, when the pressing body of one output gear is pressed against any mating body, the remaining output gears are locked, and the pressing body of at least one output gear and the anti-reverse end of one of the arc-shaped embossments cooperate with each other in an anti-reverse manner.

In one embodiment, when the rotating bracket is in a first preset position, the engaging bodies of all the output gears are respectively engaged with corresponding clamping bodies, and all the output gears are locked.

In one embodiment, the clamping body has a plurality of first clamping teeth arranged in a ring shape, and the engaging body is provided with a plurality of second clamping teeth which are engaged with the first clamping teeth.

In one embodiment, the pressing body is provided with an arc-shaped pressing end, and the mating body is provided with a groove that cooperates with the arc-shaped pressing end.

In one embodiment, the output assembly further includes a return spring, one end of the return spring is pressed against the output shaft, and the other end thereof is pressed against the other end of the output gear such that the output gear is connected to the output shaft in a movable manner.

In one embodiment, what is further comprised is a first mounting plate, and the first mounting plate is provided with a mounting hole that cooperates with the output shaft in a rotatable manner, the mounting frame is provided with at least two mounting pillars fixedly connected to the first mounting plate, and two adjacent mounting pillars are spaced apart to form a mounting position.

This technical solution also provides an antenna down-tilt control device includes the linked locking mechanism as described above and further includes:

a first transmission mechanism, and the first transmission mechanism includes an inner gear ring, a first driving gear coaxial with the inner gear ring and a first driven gear operatively connected with the first driving gear, the first driving gear can drive the first driven gear to rotate, the first driving gear and the first driven gear are installed inside the rotating bracket, a first end of the first driven gear are meshing the inner gear ring, the first driven gear only rotates around itself, or rotates around itself and also revolves around the inner gear ring, and drives the rotating bracket to rotate, a second end of the first driven gear is disposed outside the inner gear ring and inside the output gear and can drive the output gear to rotate;

a second transmission mechanism, which includes a second driving gear coaxial with the first driving gear and fixedly connected to the first driving gear, and a second driven gear operatively connected to the second driving gear, the second driving gear can drive the second driven gear to rotate, the direction of rotation of the second driven gear is opposite to that of the first driven gear, the second driven gear is installed on the rotating bracket and is arranged outside the output gear, the second driven gear can drive the output gear to rotate; and an one-way control mechanism, the one-way control mechanism is configured to control the inner gear ring to rotate only one way, that is in the first rotation direction;

when the inner gear ring is fixed, the rotating bracket can be rotated; and when the inner gear ring can be rotated, the rotating bracket is fixed.

when the antenna down-tilt angle control device is used, the output gear is fixedly connected to a transmission mechanism of an antenna waveguide through the output shaft. The first driving gear and the second driving gear are driven by a driving source (such as a servo motor). The first driving gear drives the first driven gear to rotate, and the second driving gear drives the second driven gear to rotate. The direction of rotation between the first driven gear and the second driven gear is opposite. When the first driving gear drives the first driven gear to rotate in a reverse direction of the first rotation direction, because the inner gear ring cannot rotate in the reverse direction of the first rotation direction, and the inner gear ring is fixed, the first driven gear revolves, and at the same time, the rotating bracket is rotated in the first rotation direction. The rotating bracket is rotated to a corresponding position to be adjusted, so that the pressing body of the output gear is pressed against the mating body. When the engaging body is separated from the clamping body, the output gear corresponding to the antenna is unlocked, and the first driven gear or the second driven gear is meshed with the output gear. When the rotation direction of the driving source is reversed, the first driving gear drives the first driven gear to rotate in the first rotation direction, and the second driving gear drives the second driven gear to rotate in the opposite direction to the first rotation direction. At this time, the first inner gear ring can rotate in the first rotation direction. Because the first driven gear or the second driven gear meshes with the output gear, the output gear can be driven to rotate, thereby driving the output shaft to rotate, and using the output shaft to complete power output, realizing adjustment of the down-tilt angle of the antenna. During this process, the remaining output gears are locked, and the pressing body of at least one output gear and the anti-reverse end of one of the arc-shaped embossments cooperate with each other in an anti-reverse manner to fix the rotating bracket. Furthermore, during the driving process, the down-tilt angle of other antennas will not be affected, and one-to-one driving will be achieved. At the same time, the meshing between the output gear and the first driven gear or the second driven gear will be more accurate. When the next adjustment is made, the first driven gear and the second driven gear are allowed to rotate and revolve. After reaching the position to be adjusted, the first driven gear and the second driven gear are only rotated, thus driving corresponding antenna down-tilt angle. The antenna down-tilt angle control device can realize bidirectional adjustment of the antenna down-tilt. By using the linked locking mechanism described above, the output gear is used as a positioning reference for anti-reverse, and its precise meshing with the first driven gear or the second driven gear can improve the control accuracy of the downward tilt adjustment of the antenna.

The technical solution is further explained below.

In one embodiment, the one-way control mechanism includes a one-way ratchet, and the one-way ratchet is fixed on the first mounting plate and is disposed on an outer side of the inner gear ring and is coaxially and rotationally connected with the same inner gear ring; and the one-way control mechanism further includes a stopper that can resume rotation, the stopper is fixed on the outer wall of the inner gear ring, and the stopper cooperates with the one-way ratchet so that the inner gear ring can only rotate in the first rotation direction.

In one embodiment, at least two stoppers are mounted on the outside of the inner gear ring in a rotatable manner.

In one embodiment, the rotating bracket is provided with a first cavity for mounting the first driving gear and the first driven gear, a second cavity for mounting the second driving gear and the second driven gear, and an annular wall spaced from the first cavity to form an annular groove, the arc-shaped embossment is disposed between the first cavity and the annular wall; the second cavity communicates with the first cavity and faces the arc-shaped embossment; and it also includes a cover that cooperates with the second cavity to form a receiving cavity of the second rotating component.

In one embodiment, the cover is provided with an annular body protruding outward, and the annular body is provided with a plurality of sensing portions; it also includes a second mounting plate, which is disposed facing the first mounting plate; the second mounting plate is provided with an annular concave body protruding outward that matches the annular body; an outer wall of the annular concave body is provided with a sensing element that cooperates with the sensing portions.

In one embodiment, the first mounting plate is fixedly connected to the second mounting plate; the first mounting plate is recessed inward to form a first hollow cavity, and the second mounting plate is recessed inward to form a second hollow cavity; and the second hollow cavity cooperates with the first hollow cavity to form a protective cavity.

DESCRIPTION OF REFERENCE NUMERALS

10: linked locking mechanism;
100: mounting frame;
110: mounting position;
112: mounting through hole;
114: clamping body;
120: mounting pillar;
200: output assembly;
210: output shaft;
220: output gear;
221: buckle body;
223: pressing body;
202: curved pressing end;
230: return spring;
300: rotating bracket;
310: pressure bearing surface;
320: arc-shaped embossment;
322: guide end;
324: anti-reverse end;
326: mating body;
330: first cavity;
340: second cavity;
350: annular wall;
302: annular groove;
400: first mounting plate;
410: mounting hole;
420: first hollow cavity;
500: cover;
510: annular body;
512: induction portion;
600: second mounting plate;
610: annular concave body;
620: induction element;
630: second hollow cavity;
20: first transmission mechanism;
22: inner gear ring;
23: first driving gear;
24: first driven gear;
30: second transmission mechanism;
32: second driving gear;
34: second driven gear;
36: third driven gear;
40: one-way control mechanism;
42: rotating member;
44: stopper.

DETAILED DESCRIPTION OF THE INVENTION

To make the objectives, technical solution, and advantages of the present invention clearer, the following further describes the present invention in detail with reference to the accompanying drawings and specific embodiments. It should be understood that the specific embodiments described herein are only used to explain the present invention, and do not limit the protection scope of the present invention.

It should be noted that when an element is called "fixed to" another element, it can be directly located on another element or there can be an intermediate element. At the same time, fixing method of the two can be detachable and fixed, or can be a non-detachable connection. Specifically, it can be such as sleeve connection, snap connection, integral molding or welding. When an element is considered to be "connected" to another element, it can be directly connected to the other element or an intermediate element may also be present. When one component is considered as a "fixed transmission connection" to the other component, the two can be fixed in a detachable or fixed manner, such as sleeve connection, snap connection, integral molding, welding, etc. When an element forms an "active connection" with another element, the two can be engaged with each other, or transmit power through another transmission gear assembly to drive the other element to rotate. The terms "vertical", "horizontal", "left", "right" and similar expressions used herein are for illustrative purposes only and are not meant to be the only implementations.

Unless defined otherwise, all technical and scientific terms used herein have the same meaning as commonly understood by one of ordinary skill in the art to which this invention belongs. The terms used herein in the description of the present invention are only for the purpose of describing specific embodiments, and are not intended to limit the present invention. The term "and/or" as used herein includes any and all combinations of one or more of the associated listed items. A "first rotation direction" can be defined as the clockwise rotation direction of the drive source (−), and the "reverse direction of the first rotation direction" is the counterclockwise rotation direction of the drive source (+).

The terms "first" and "second" in the present invention do not represent a specific quantity and order, but are only used to distinguish names.

As shown in FIGS. 1-4, a linked locking mechanism 10 according to the present invention includes: a mounting frame 100 which is provided with at least two mounting positions 110, the mounting position 110 is provided with a mounting through hole 112 and a clamping body 114 provided along an outer circumferential direction of the mounting through hole 112, all the mounting through holes 112 are spaced along a same circumferential direction; an output assembly 200 corresponding to a respective mounting position 110, the output assembly 200 includes an output shaft 210 and an output gear 220 which is resiliently disposed on the output shaft 210, one end of the output gear 220 is provided with an engaging body 221 engaged with the clamping body 114 and a pressing body 223 provided through the mounting through hole 112, the engaging body 221 is disposed outside the pressing body 223; and a rotating bracket 300, which can be rotated relative to the mounting frame 100. The rotating bracket 300 is provided with a pressure bearing surface 310 that is pressed against the pressing body 223 and at least two arc-shaped embossments 320 provided on the pressure bearing surface 310. All the arc-shaped embossments 320 are spaced along a same circumferential direction. The arc-shaped embossment 320 includes a guide end 322, an anti-reverse end 324, and a mating body 326 provided between the guide end 322 and the anti-reverse end 324. Only when the mating body 326 and the pressing body 223 abut, and the engaging body 221 and the clamping body 114 are separated from each other, the output gear 220 can drive the output shaft 210 to rotate. When the pressing body 223 of one output gear 220 is pressed against any mating body 326, the remaining output gears 220 are locked, and the pressing body 223 of at least one output gear 220 and the anti-reverse end 324 of one of the arc-shaped embossments 320 cooperate with each other in an anti-reverse manner.

As shown in FIGS. 1 to 10, the above-mentioned linked locking mechanism 10 is applied to an antenna down-tilt angle control device. Anti-rotation structure formed by the arc-shaped embossment 320 and the pressing body 223 of the rotating bracket 300 is used. A planetary gear mechanism and one-way control mechanism at the same time is used. The rotating bracket 300 is a planetary carrier and can only rotate in one direction. At the same time, the arc-shaped embossment 320 is used to cooperate with the pressing body 223 of the output gear 220 to realize the engagement and separation of the clamping body 114 and the engaging body 221, enabling the output gear 220 to be self-locked or unlocked.

Specifically, when a certain output gear 220 needs to be driven to rotate, the rotating bracket 300 is controlled to rotate to a corresponding position, so that the pressing body 223 is pressed against the mating body 326, and the engaging body 221 and the clamping body 114 are separated to unlock a corresponding output gear 220 of the antenna. At this time, the output gear 220 can be driven to rotate, which in turn drives the output shaft 210 to rotate. The output shaft 210 is used to output power and adjust the down-tilt angle of the antenna. During this process, the remaining output gears 220 are locked, and the pressing body 223 of at least one output gear 220 and the anti-reverse end 324 of one of the arc-shaped embossments 320 cooperate with each other in an anti-reverse manner. Furthermore, during the driving process, the other output gears 220 are not affected, and one-to-one driving is achieved. At the same time, the meshing of the output gears 220 and input gears (such as the first driven gear 24 and the second driven gear 34) is more precise. The linked locking mechanism 10 adopts an integrated structure, and uses the output gear 220 and the anti-reverse end 324 as a positioning reference to improve the gear meshing accuracy, which can improve the control accuracy of the downward tilt adjustment of two or more beam antennas.

It needs to be further explained that the number of arc-shaped embossments 320 and the adjacent pitches can be determined according to the number of the output gears 220 and adjacent pitch there-between. As long as "when the at least one pressing body 223 of the output gear 220 and the anti-reverse end 324 of one of the arc-shaped embossments 320 cooperate with each other in an anti-reverse manner, the pressing body 223 of only one of the output gears 220 is press-fitting with the mating body 326 of an arc-shaped embossment 320, then it is within the scope of the present invention.

Figure 5:
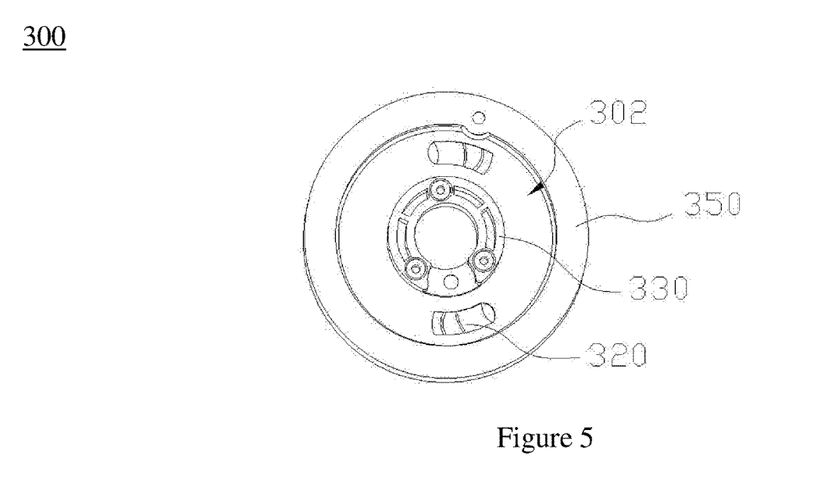
FIG. 5 is a schematic structural diagram of a first embodiment of a rotating bracket according to the present invention.
Figure 7:
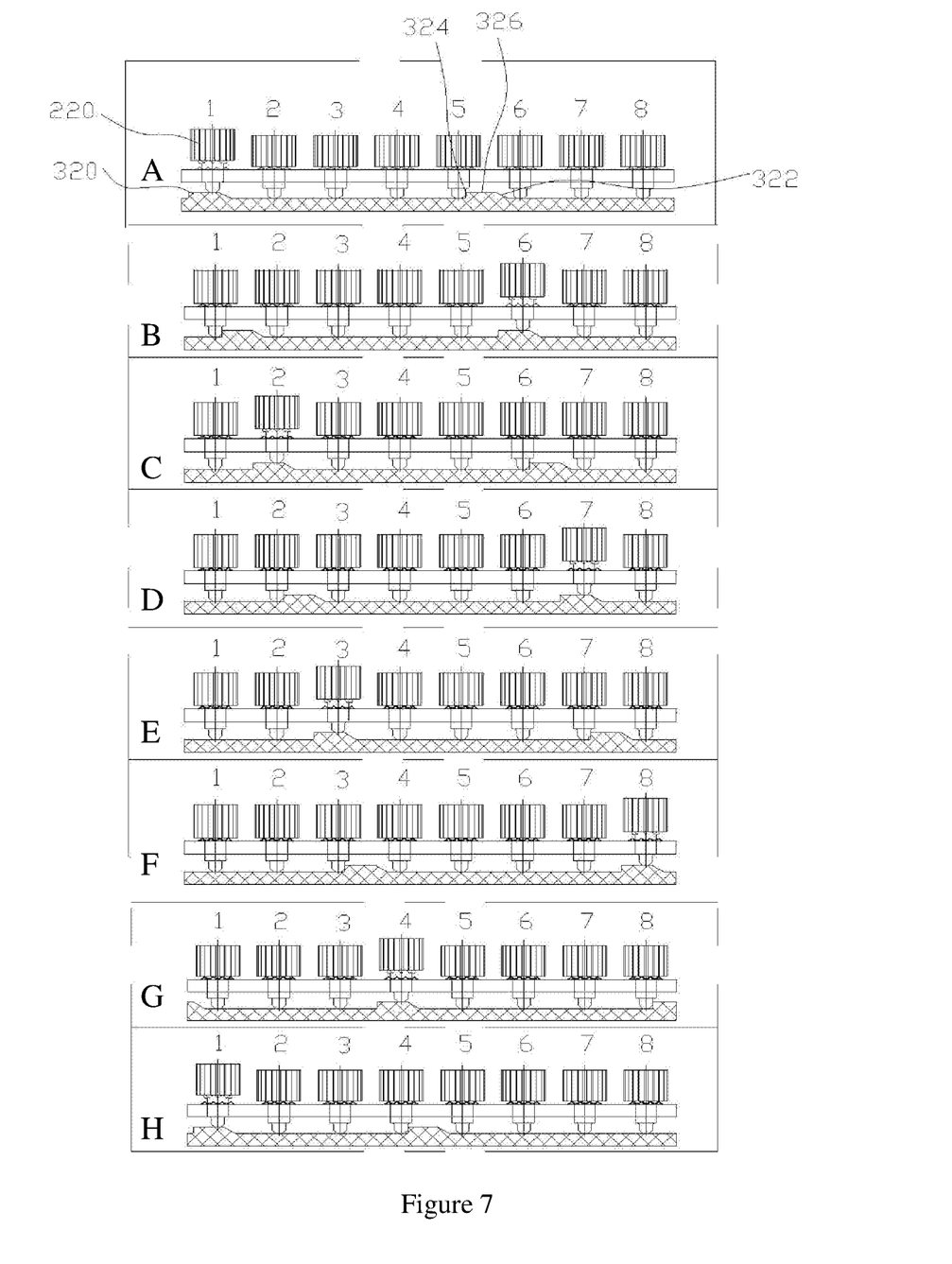
FIG. 7 is a schematic diagram of the motion laws "A to H" of eight output gears and two arc-shaped embossments according to the present invention.
Figure 8:
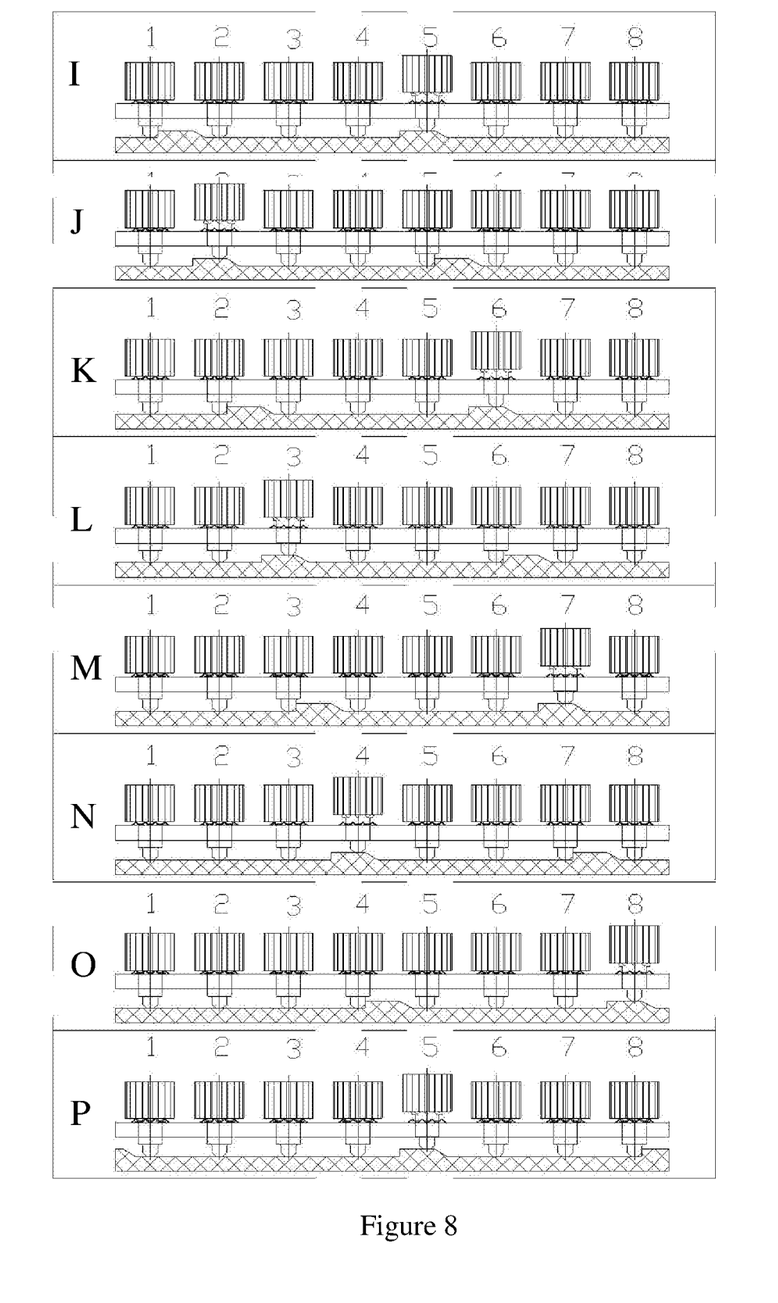
FIG. 8 is a schematic diagram of the motion laws "G to P" of the eight output gears and two arc-shaped embossments according to the present invention.

Specifically, as shown in FIGS. 5, 7 and 8, eight output gears 220 and two arc-shaped embossments 320 are taken as an embodiment. "0" means unlocking (+); "1" means unlocking (−); "2" means locking; and "3" means anti-reverse rotation. The state of the gear is shown in table 1 below. Conclusion: in each state, there is only one gear that is unlocked, the remaining output gears 220 are locked, and at least one output gear is prevented from being reversely rotated.

Figure 6:
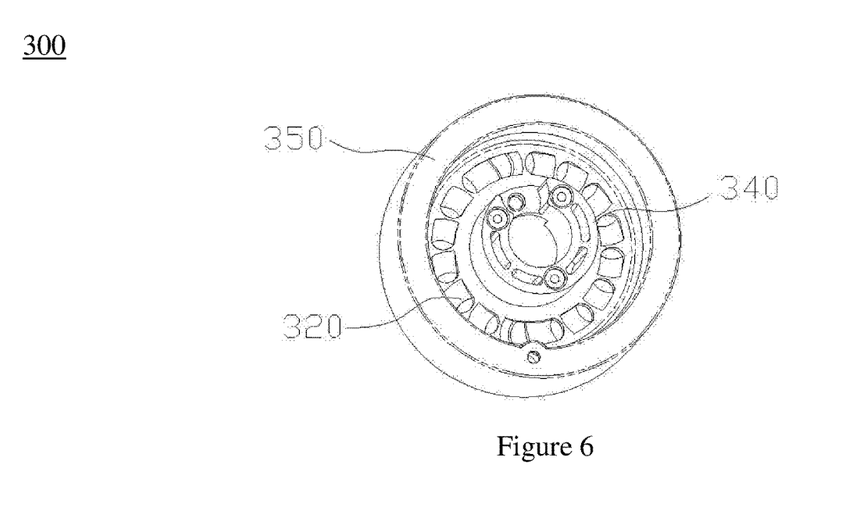
FIG. 6 is a schematic structural diagram of a second embodiment of a rotating bracket according to the present invention.
Figure 9:
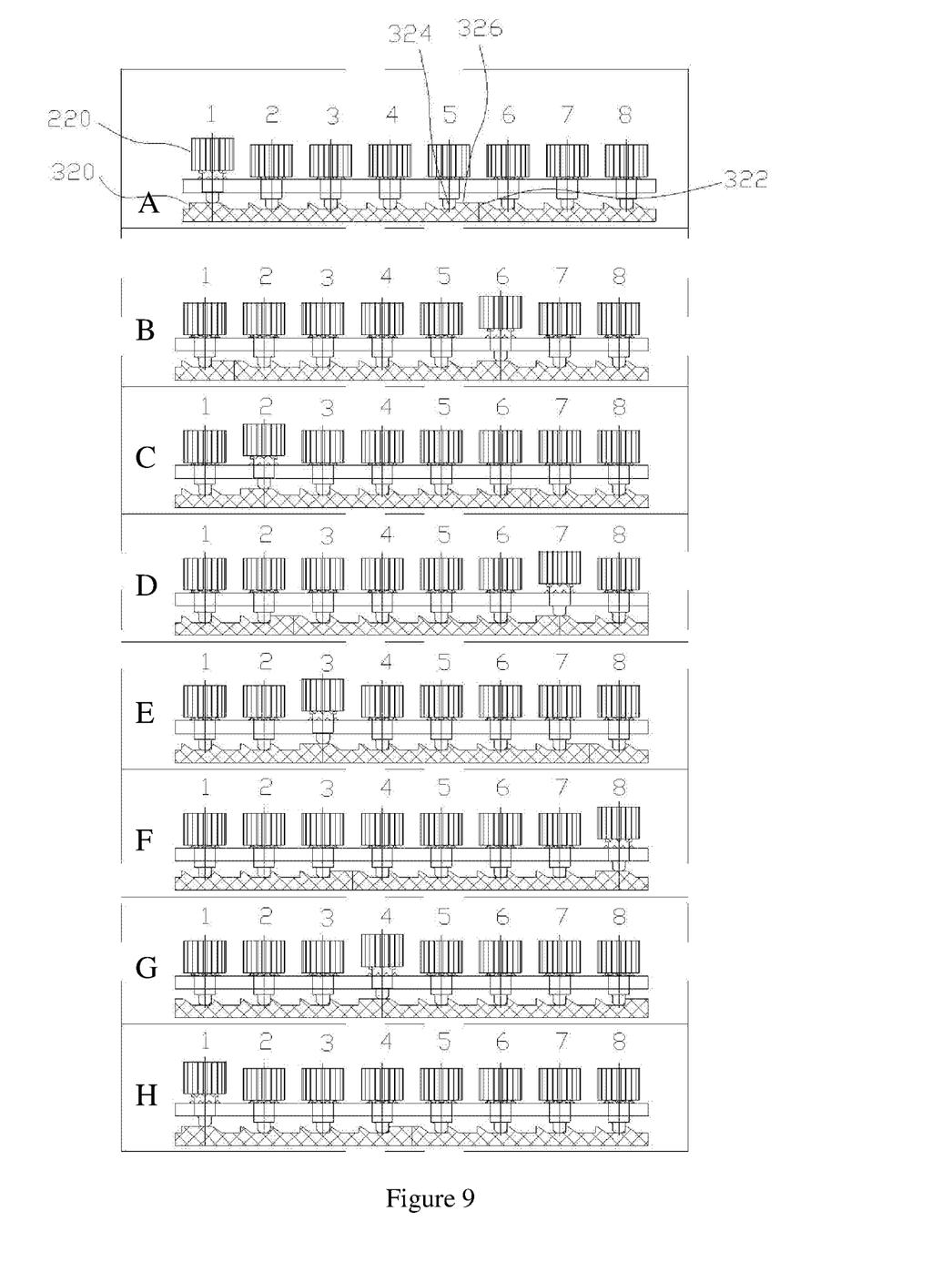
FIG. 9 is a schematic diagram of the motion laws "A to H" of eight output gears and eight arc-shaped embossments according to the present invention.
Figure 10:
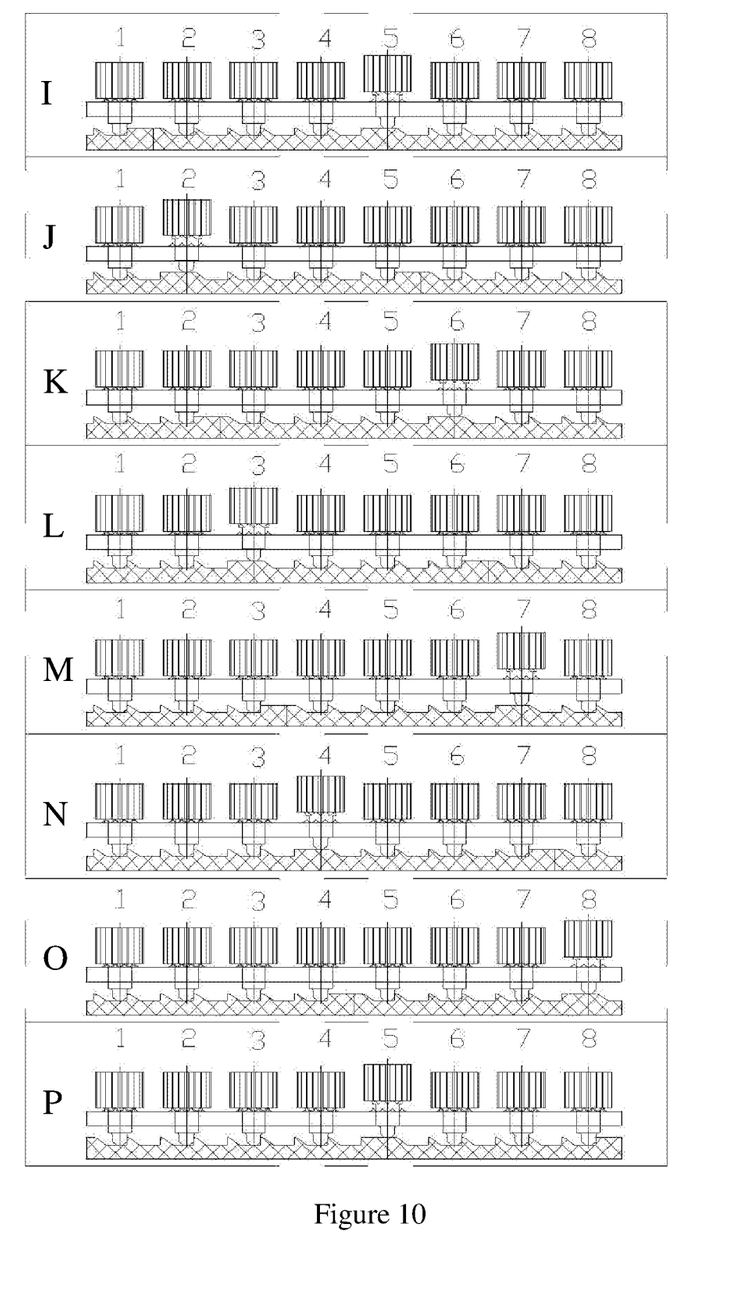
FIG. 10 is a schematic diagram of the motion laws "G to P" of eight output gears and eight arc-shaped embossments according to the present invention.

As shown in FIGS. 6, 9 and 10, eight output gears 220 and eight arc-shaped bosses 320 are used as an embodiment. "0" means unlocking and the counterclockwise rotation direction is (+); "1" means unlocking and the clockwise rotation direction is (−); "2" means locking; "3" means anti-reverse rotation, and gear status is shown in table 2 below. Conclusion: in each state, there is only one unlocked gear, and the remaining output gears are locked and prevented from being reversely rotated.

Further, when the rotating bracket 300 is in a first preset position, the engaging bodies 221 of all the output gears 220 are respectively engaged with the corresponding clamping bodies 114, all the output gears 220 are locked, and at least one pressing body 223 is prevented from being moved. Furthermore, by adding an anti-reverse rotation structure, when the rotating bracket 300 is in the first preset position, the engaging bodies 221 of all the output gears 220 are respectively engaged with the corresponding clamping body 114, and all the output gears 220 are locked, and the rotating bracket 300 is prevented from being rotated reversely. Because the output gear 220 has a resilient function, forward rotation of the rotating bracket 300 would not occur easily. Therefore, the output gear 220 is locked, avoiding change of the antenna down-tilt angle due to collision or other factors during regular use. Only when adjustment of the antenna is needed, the output gear 220 corresponding to the antenna to be adjusted can be unlocked, further improving the meshing accuracy of the output gear 220 and the first driven gear 24 or the second driven gear 34 and the control accuracy of the output gear 220.

TABLE 1

Analysis of the movement patterns of eight output gears 220 and two arc-shaped embossments 320

| Status Number | 1 | 2 | 3 | 4 | 5 | 6 | 7 | 8 |
|---|---|---|---|---|---|---|---|---|
| A | 0 | 2 | 2 | 2 | 3 | 2 | 2 | 2 |

TABLE 1-continued

Analysis of the movement patterns of eight output
gears 220 and two arc-shaped embossments 320

| Status Number | 1 | 2 | 3 | 4 | 5 | 6 | 7 | 8 |
|---|---|---|---|---|---|---|---|---|
| B | 3 | 2 | 2 | 2 | 2 | 1 | 2 | 2 |
| C | 2 | 0 | 2 | 2 | 2 | 3 | 2 | 2 |
| D | 2 | 3 | 2 | 2 | 2 | 2 | 1 | 2 |
| E | 2 | 2 | 0 | 2 | 2 | 2 | 3 | 2 |
| F | 2 | 2 | 3 | 2 | 2 | 2 | 2 | 1 |
| G | 2 | 2 | 2 | 0 | 2 | 2 | 2 | 3 |
| H | 1 | 2 | 2 | 3 | 2 | 2 | 2 | 2 |
| I | 3 | 2 | 2 | 2 | 0 | 2 | 2 | 2 |
| J | 2 | 1 | 2 | 2 | 3 | 2 | 2 | 2 |
| K | 2 | 3 | 2 | 2 | 2 | 0 | 2 | 2 |
| L | 2 | 2 | 1 | 2 | 2 | 3 | 2 | 2 |
| M | 2 | 2 | 3 | 2 | 2 | 2 | 0 | 2 |
| N | 2 | 2 | 2 | 1 | 2 | 2 | 3 | 2 |
| O | 2 | 2 | 2 | 3 | 2 | 2 | 2 | 0 |
| P | 2 | 2 | 2 | 2 | 1 | 2 | 2 | 3 |

Figure 2:
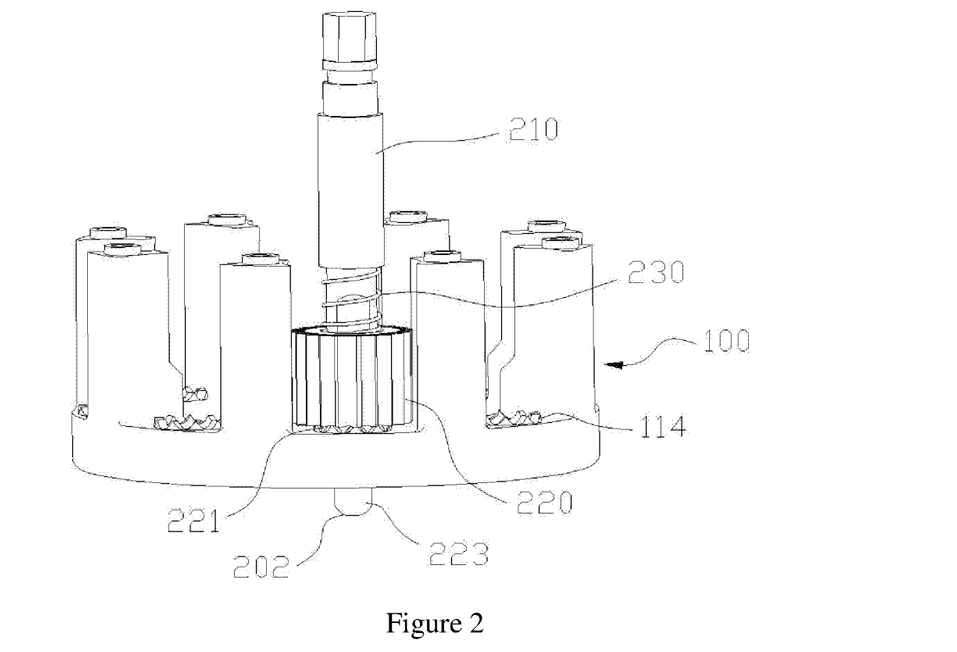
FIG. 2 is a schematic diagram of a mounting frame and an output assembly according to the present invention.
Figure 3:
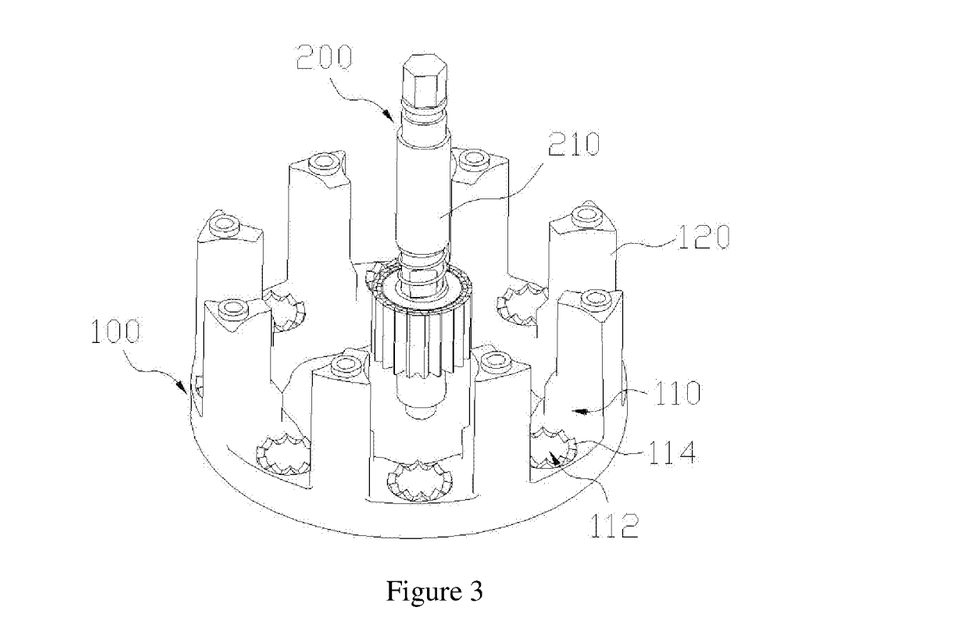
FIG. 3 is a schematic structural explosion diagram of the mounting frame and the output assembly according to the present invention.
Figure 4:
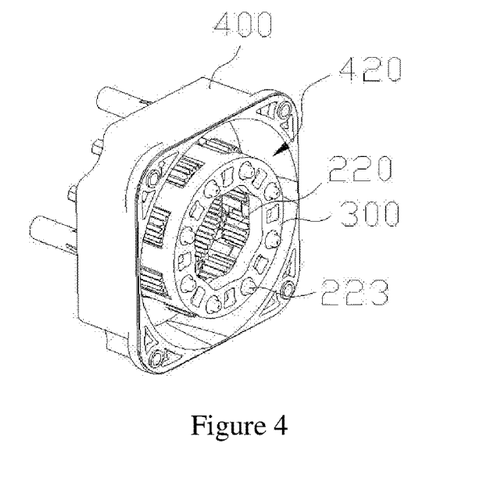
FIG. 4 is a schematic diagram of the installation of the mounting frame and a first mounting plate according to the present invention.

In addition, the specific engagement of the clamping body 114 and the engaging body 221 can be configured based on need, as long as the output gear 220 can be moved upward to unlock and move downward to lock, such as engagement between a cone and a keyhole. As shown in FIGS. 2-3, specifically, the clamping body 114 has a plurality of first clamping teeth arranged in a ring shape, and the engaging body 221 is provided with a plurality of second clamping teeth which are engaged with the first clamping teeth. The tooth shape of the first clamping tooth has a U-shaped structure, and the tooth shape of the second clamping tooth has a triangular structure, which is convenient for automatic resetting and being secured.

TABLE 2

Analysis of movement patterns of eight output
gears 220 and two arc-shaped embossments 320

| Status Number | 1 | 2 | 3 | 4 | 5 | 6 | 7 | 8 |
|---|---|---|---|---|---|---|---|---|
| A | 0 | 3 | 3 | 3 | 3 | 3 | 3 | 3 |
| B | 3 | 3 | 3 | 3 | 3 | 1 | 3 | 3 |
| C | 3 | 0 | 3 | 3 | 3 | 3 | 3 | 3 |
| D | 3 | 3 | 3 | 3 | 3 | 3 | 1 | 3 |
| E | 3 | 3 | 0 | 3 | 3 | 3 | 3 | 3 |
| F | 3 | 3 | 3 | 3 | 3 | 3 | 3 | 1 |
| G | 3 | 3 | 3 | 0 | 3 | 3 | 3 | 3 |
| H | 1 | 3 | 3 | 3 | 3 | 3 | 3 | 3 |
| I | 3 | 3 | 3 | 3 | 0 | 3 | 3 | 3 |
| J | 3 | 1 | 3 | 3 | 3 | 3 | 3 | 3 |
| K | 3 | 3 | 3 | 3 | 3 | 0 | 3 | 3 |
| L | 3 | 3 | 1 | 3 | 3 | 3 | 3 | 3 |
| M | 3 | 3 | 3 | 3 | 3 | 3 | 0 | 3 |
| N | 3 | 3 | 3 | 1 | 3 | 3 | 3 | 3 |
| O | 3 | 3 | 3 | 3 | 3 | 3 | 3 | 0 |
| P | 3 | 3 | 3 | 3 | 1 | 3 | 3 | 3 |

In any of the above embodiments, the pressing body 223 is provided with an arc-shaped pressing end 202, and the mating body 326 is provided with a groove (not shown) that cooperates with the arc-shaped pressing end 202. Through the cooperation of the arc-shaped pressing end 202 and the groove, the rotation of the output gear 220 is smoother and unnecessary wear is reduced.

Figure 1:
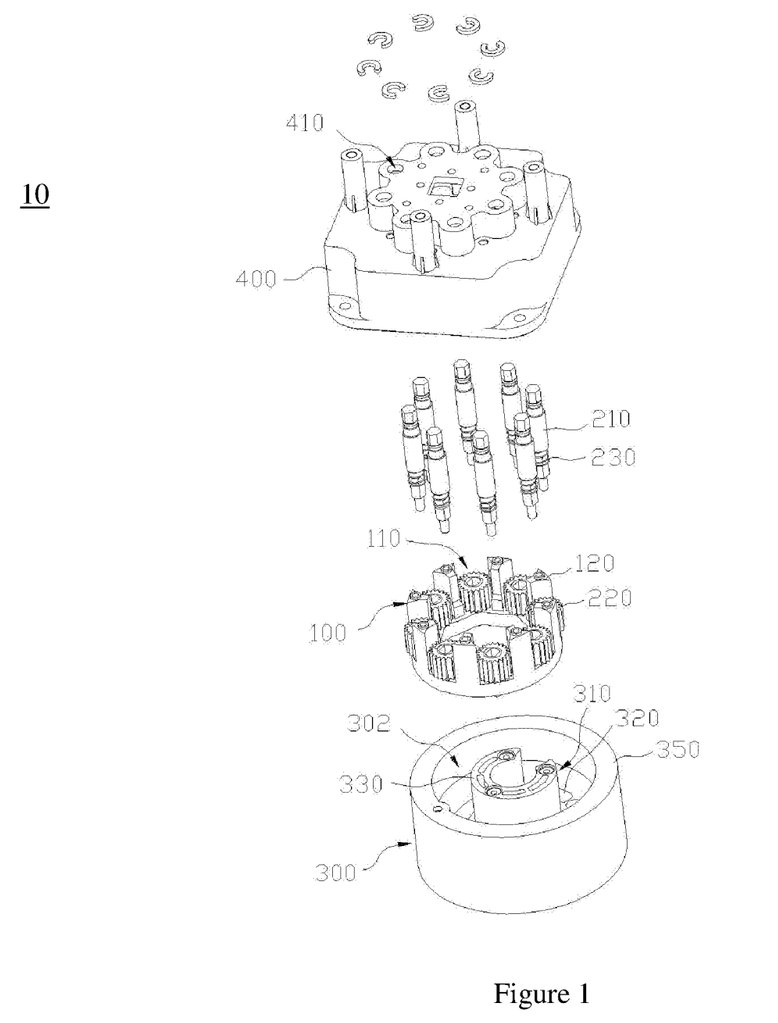
FIG. 1 is a schematic structural explosion diagram of a linked locking mechanism according to the present invention.

As shown in FIGS. 1-3, in any of the above embodiments, the output assembly 200 further includes a return spring 230. One end of the return spring 230 is pressed against the output shaft 210, and the other end thereof is pressed against the other end of the output gear 220 such that the output gear 220 is connected to the output shaft 210 in a movable manner. Specifically, the output gear 220 is provided with a through hole matched with the output shaft 210 in a sliding manner and an engaging slot provided on an inner wall of the through hole, and the output shaft 210 is provided with a protrusion body fitted with the engaging slot in a sliding manner. Further, it further includes a first mounting plate 400, and the first mounting plate 400 is provided with a mounting hole 410 that cooperates with the output shaft 210 in a rotatable manner. The mounting frame 100 is provided with at least two mounting pillars 120 fixedly connected to the first mounting plate 400, and two adjacent mounting pillars 120 are spaced apart to form a mounting position 110. Further, the cooperation of the first mounting plate 400 and the mounting frame 100 is used to realize the installation and fixation of the output assembly 200, so that the output assembly 200 and the mounting frame 100 are fixed on the first mounting plate 400 to form an integrated structure. The number of the mounting positions 110 can be set according to the layout of the output gears 220.

Figure 11:
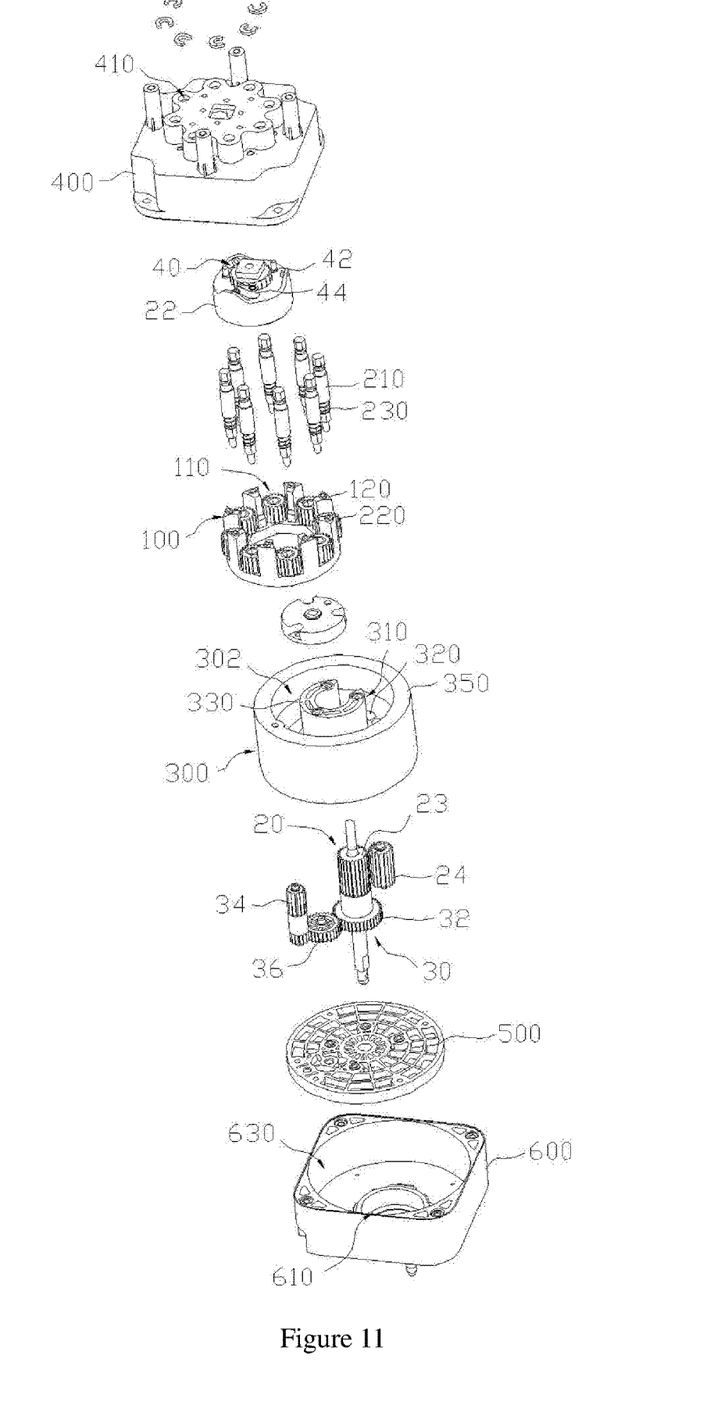
FIG. 11 is a schematic structural explosion diagram of an antenna down-tilt angle control device according to the present invention.

As shown in FIGS. 1 and 11, the present invention also provides an antenna down-tilt angle control device, which includes the linked locking mechanism 10 described above, and further includes: a first transmission mechanism 20, and the first transmission mechanism 20 includes an inner gear ring 22, a first driving gear 23 coaxial with the inner gear ring 22 and a first driven gear 24 operatively connected with the first driving gear 23, the first driving gear 23 can drive the first driven gear 24 to rotate, the first driving gear 23 and the first driven gear 24 are installed inside the rotating bracket 300, a first end of the first driven gear 24 are meshing the inner gear ring 22, the first driven gear 24 only rotates around itself, or rotates around itself and revolves around the inner gear ring 22, and drives the rotating bracket 300 to rotate, a second end of the first driven gear 24 is disposed outside the inner gear ring 22 and inside the output gear 220 and can drive the output gear 220 to rotate; a second transmission mechanism 30, which includes a second driving gear 32 coaxial with the first driving gear 23 and fixedly connected to the first driving gear 23, and a second driven gear 34 operatively connected to the second driving gear 32, the second driving gear 32 can drive the second driven gear 34 to rotate, the direction of rotation of the second driven gear 34 is opposite to that of the first driven gear 24, the second driven gear 34 is installed on the rotating bracket 300 and is arranged outside the output gear 220, the second driven gear 34 can drive the output gear 220 to rotate; and an one-way control mechanism 40, the one-way control mechanism 40 is configured to control the inner gear ring to rotate only one way, that is in the first rotation direction; here, when the inner gear ring 22 is fixed, the rotating bracket 300 can be rotated; and when the inner gear ring 22 can be rotated, the rotating bracket 300 is fixed.

As shown in FIGS. 1 to 11, when the antenna down-tilt angle control device is used, the output gear 220 is fixedly connected to a transmission mechanism of an antenna waveguide through the output shaft 210. The first driving gear 23 and the second driving gear 32 are driven by a driving source. The first driving gear 23 drives the first driven gear 24 to rotate, and the second driving gear 32 drives the second driven gear 34 to rotate. The direction of rotation between the first driven gear 24 and the second driven gear 34 is opposite. When the first driving gear 23 drives the first driven gear 24 to rotate in a reverse direction of the first rotation direction, because the inner gear ring 22 cannot rotate in the reverse direction of the first rotation direction, and the inner gear ring 22 is fixed, the first driven gear 24 revolves, and at the same time, the rotating bracket 300 is rotated in the first rotation direction. The rotating bracket 300 is rotated to a corresponding position to be adjusted, so that the pressing body 223 of the output gear 220 is pressed against the mating body 326. When the engaging body 221 is separated from the clamping body 114, the output gear 220 corresponding to the antenna is unlocked, and the first driven gear 24 or the second driven gear 34 is meshed with the output gear 220. When the rotation direction of the driving source is reversed, the first driving gear 23 drives the first driven gear 24 to rotate in the first rotation direction, and the second driving gear 32 drives the second driven gear 34 to rotate in the opposite direction to the first rotation direction. At this time, the first inner gear ring 22 can rotate in the first rotation direction. Because the first driven gear 24 or the second driven gear 34 meshes with the output gear 220, the output gear 220 can be driven to rotate, thereby driving the output shaft 210 to rotate, and using the output shaft 210 to produce power output, realizing adjustment of the down-tilt angle of the antenna. During this process, the remaining output gears 220 are locked, and the pressing body 223 of at least one output gear 220 and the anti-reverse end 324 of one of the arc-shaped embossments 320 cooperate with each other in an anti-reverse manner in order to fix the rotating bracket 300. Furthermore, during the driving process, the down-tilt angles of other antennas would not be affected, and one-to-one driving is achieved. At the same time, the meshing between the output gear 220 and the first driven gear 24 or the second driven gear 34 will be more accurate. When the next adjustment is made, the first driven gear 24 and the second driven gear 34 are allowed to rotate and revolve. After reaching the position to be adjusted, the first driven gear 24 and the second driven gear 34 are only rotated, thus driving corresponding antenna down-tilt angle. The antenna down-tilt angle control device can realize bidirectional adjustment of the antenna down-tilt. By using the linked locking mechanism 10 described above, the output gear 220 is used as a positioning reference for anti-reverse, and its precise meshing with the first driven gear 24 or the second driven gear 34 can improve the control accuracy of the downward tilt adjustment of the antenna.

Specific embodiments of the one-way control mechanism 40, such as a one-way clutch, a one-way bearing, a ratchet mechanism, and the like should be explained. Specifically, the one-way control mechanism 40 is a one-way bearing, and the inner ring of the one-way bearing and the inner gear ring 22 are fixed together, and the outer ring is fixed on the first mounting plate 400. Therefore, the one-way bearing can be used to realize the effect that the inner gear ring rotates only one way along the first rotation direction, and the revolution or rotation of the first driven gear 24 is realized. The one-way bearing has fast response speed but higher cost, and anti-rotation accuracy is insufficient. Having neither positioning function nor correction function, the one-way bearing could easily result in insufficient rotation or excessive rotation, causing the planetary gear and the output gear 220 cannot be meshed well. Further, the one-way control mechanism 40 includes a one-way ratchet 42, and the one-way ratchet 42 is fixed on the first mounting plate 400 and is disposed on an outer side of the inner gear ring 22 and is coaxially and rotationally connected with the same inner gear ring 22. The one-way control mechanism 40 further includes a stopper 44 that can resume rotation. The stopper 44 is fixed on the outer wall of the inner gear ring 22, and the stopper 44 cooperates with the one-way ratchet 42 so that the inner gear ring 22 can only rotate in the first rotation direction. The one-way ratchet 42 is used to control the rotation direction of the inner gear ring, which is convenient for positioning the output gear 220, so that the first driven gear 24 or the second driven gear 34 and the output gear 220 mesh more accurately to avoid tooth skipping during transmission, resulting in inaccurate adjustment. Further still, at least two stoppers 44 are mounted on the outside of the inner gear ring 22 in a rotatable manner, so that the fixation of the inner gear ring 22 is more secure, and the overall structure is more compact.

As shown in FIGS. 5-6, and FIGS. 13 to 15, based on any of the above embodiments, the rotating bracket 300 is provided with a first cavity 330 for mounting the first driving gear 23 and the first driven gear 24, a second cavity 340 for mounting the second driving gear 32 and the second driven gear 34, and an annular wall 350 spaced from the first cavity 330 to form an annular groove 302. The arc-shaped embossment 320 is disposed between the first cavity 330 and the annular wall 350. The second cavity 340 communicates with the first cavity 330 and faces the arc-shaped embossment 320. It also includes a cover 500 that cooperates with the second cavity 340 to form a receiving cavity of the second rotating component. Furthermore, the rotating bracket 300 is set as a planetary carrier, realizing installation and lubrication of the first driving gear 23, the first driven gear 24, the second driving gear 32 and the second driven gear 34. The mounting frame 100 can be disposed in the annular groove 302 to make the overall structure more compact. At the same time, the cover 500 is used to realize the installation and protection of the second rotating component.

Figure 13:
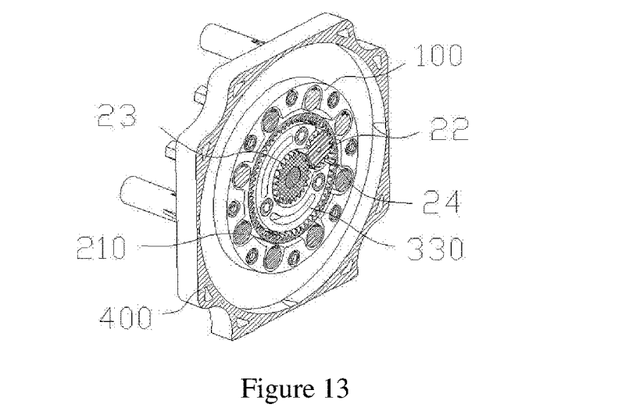
FIG. 13 is a schematic cross-sectional view of a first cross section of an antenna down-tilt angle control device according to the present invention after assembly.
Figure 14:
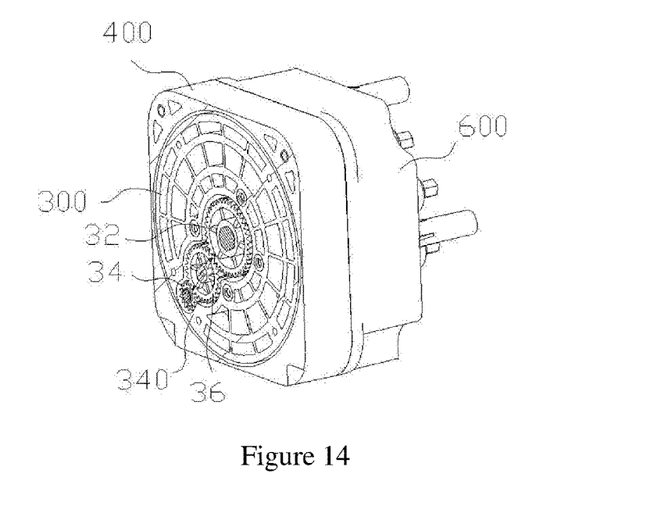
FIG. 14 is a schematic cross-sectional view of a second cross section of an antenna down-tilt angle control device according to the present invention after assembly.

As shown in FIGS. 11, 13 and 14, specifically, one end of the second driven gear 34 is meshed with a third driven gear 36, and the other end may be meshed with the output gear 220. The first driving gear 23 directly meshes with the first driven gear 24, and the second driving gear 32 drives the second driven gear 34 to rotate through the third driven gear 36, and as such the first driven gear 24 and the second driven gear 34 rotate in opposite directions, and the overall structure is more compact.

Figure 15:
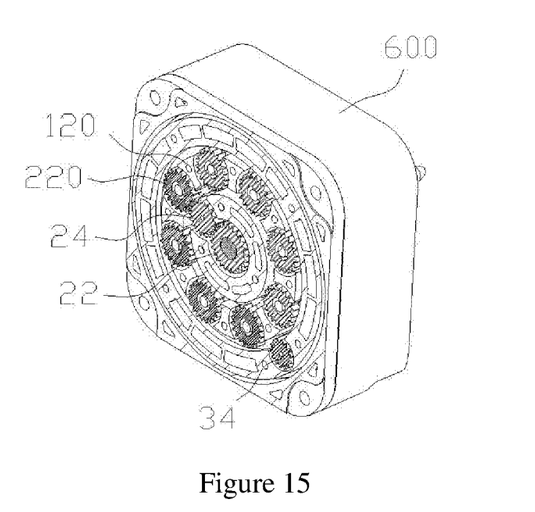
FIG. 15 is a schematic cross-sectional view of a third cross section of an antenna down-tilt angle control device according to the present invention after assembly.
Figure 16:
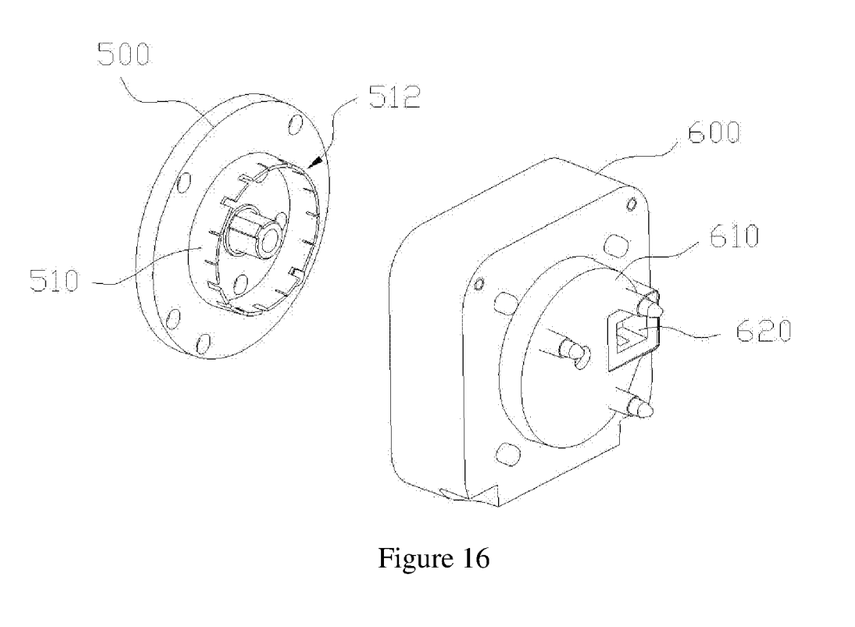
FIG. 16 is a schematic diagram of the cooperation between an annular body and an annular concave body according to the present invention.

As shown in FIGS. 11 and 15, further, the cover 500 is provided with an annular body 510 protruding outward, and the annular body 510 is provided with a plurality of sensing portions 512. It also includes a second mounting plate 600, which is disposed facing the first mounting plate 400. The second mounting plate 600 is provided with an annular concave body 610 protruding outward that matches the annular body 510. An outer wall of the annular concave body 610 is provided with a sensing element 620 that cooperates with the sensing portions 512. Therefore, the position of the first driven gear 24 or the second driven gear 34 can be identified using the sensing element 620 to sense and inspect the sensing portions 512. It is convenient to make the driving source move according to the positions of the first driven gear 24 and the second driven gear 34 to realize the driving of the down-tilt angle of a waveguide antenna. Specifically, the sensing portion 512 may be a notch, a protrusion, or a groove, etc. In this embodiment, the sensing portion 512 includes at least two first sensing notches (not shown) arranged at uniform intervals in the circumferential direction and two second sensing notches (not shown) disposed between two adjacent first sensing notches. Therefore, the position of the first driven gear 24 or the second driven gear 34 can be determined using the first sensing notch, and the position of the first driven gear 24 or the fourth driven gear can be calibrated using the second sensing notch. The first sensing notch is different from the second sensing notch, and the specific structure can be selected according to actual needs. The sensing element 620 may be a photoelectric sensor, a displacement sensor, or the like.

Figure 12:
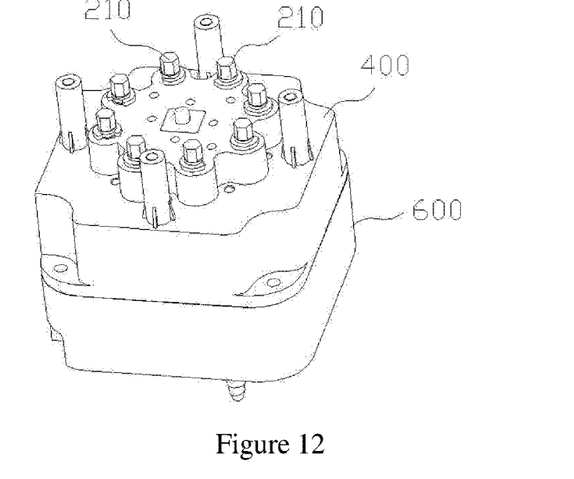
FIG. 12 is a schematic structural diagram of an antenna down-tilt angle control device according to the present invention after assembly.

As shown in FIGS. 11 and 12, further, the first mounting plate 400 is fixedly connected to the second mounting plate 600. The first mounting plate 400 is recessed inward to form a first hollow cavity 420, and the second mounting plate 600 is recessed inward to form a second hollow cavity 630. The second hollow cavity 630 cooperates with the first hollow cavity 420 to form a protective cavity. Therefore, the first mounting plate 400 and the second mounting plate 600 are used to form a protective cavity. The linked locking mechanism 10, the first transmission mechanism 20, the second transmission mechanism 30, and the one-way control mechanism 40 can be set in the protective cavity to better protect related parts, while making the overall structure compact and easy to carry.

The technical features of the embodiments described above can be arbitrarily combined. In order to simplify the description, all possible combinations of the technical features in the above embodiments have not been described. However, as long as there is no contradiction in the combination of these technical features, it should be considered as the scope described in this specification.

The above-mentioned embodiments only express several implementation manners of the present invention, and their description is more specific and detailed, but they cannot be understood as limiting the scope of the invention patent. It should be noted that, for those of ordinary skill in the art, without departing from the concept of the present invention, several modifications and improvements can be made, which all belong to the protection scope of the present invention. Therefore, the protection scope of the invention patent shall be subject to the appended claims.

The invention claimed is:

1. A linked locking mechanism, comprising:
   a mounting frame which is provided with at least two mounting positions, each mounting position is provided with a mounting through hole and a clamping body provided along an outer circumferential direction of the mounting through hole, all the mounting through holes are spaced along a same circumferential direction;
   an output assembly corresponding to a respective mounting position, the output assembly includes an output shaft and an output gear which is resiliently disposed on the output shaft, one end of the output gear is provided with an engaging body engaged with the clamping body and a pressing body passing through the mounting through hole, the engaging body is disposed outside the pressing body; and
   a rotating bracket, which can be rotated relative to the mounting frame, the rotating bracket is provided with a pressure bearing surface that is pressed against the pressing body and at least two arc-shaped embossments provided on the pressure bearing surface, all the arc-shaped embossments are spaced along a same circumferential direction, the arc-shaped embossment includes a guide end, an anti-reverse end, and a mating body provided between the guide end and the anti-reverse end, only when the mating body and the pressing body abut, and the engaging body and the clamping body are separated from each other, the output gear can drive the output shaft to rotate.

2. The linked locking mechanism as recited in claim 1, wherein when the pressing body of at least one output gear cooperates with an anti-reverse end of the arc-shaped embossment in an anti-reverse manner, among the remaining output gears, a pressing body of only one output gear is pressed against a corresponding mating body.

3. The linked locking mechanism as recited in claim 2, wherein when the rotating bracket is in a first preset position, the engaging bodies of all the output gears are respectively engaged with corresponding clamping bodies, and all the output gears are locked.

4. The linked locking mechanism as recited in claim 1, wherein the clamping body has a plurality of first clamping teeth arranged in a ring shape, and the engaging body is provided with a plurality of second clamping teeth which are engaged with the first clamping teeth.

5. The linked locking mechanism as recited in claim 1, wherein the pressing body is provided with an arc-shaped pressing end, and the mating body is provided with a groove that cooperates with the arc-shaped pressing end.

6. The linked locking mechanism as recited in claim 1, wherein the output assembly further includes a return spring, one end of the return spring is pressed against the output shaft, and the other end thereof is pressed against the other end of the output gear such that the output gear is connected to the output shaft in a movable manner.

7. The linked locking mechanism as recited in claim 6, further comprising a first mounting plate, and the first mounting plate is provided with a mounting hole that cooperates with the output shaft in a rotatable manner, the mounting frame is provided with at least two mounting pillars fixedly connected to the first mounting plate, and two adjacent mounting pillars are spaced apart to form a mounting position.

8. An antenna down-tilt control device, comprising the linked locking mechanism according to claim 1, further comprising:
   a first transmission mechanism, and the first transmission mechanism includes an inner gear ring, a first driving gear coaxial with the inner gear ring and a first driven gear operatively connected with the first driving gear, the first driving gear can drive the first driven gear to rotate, the first driving gear and the first driven gear are installed inside the rotating bracket, a first end of the first driven gear are meshing the inner gear ring, the first driven gear only rotates around itself, or rotates around itself and revolves around the inner gear ring, and drives the rotating bracket to rotate, a second end of the first driven gear is disposed outside the inner gear ring and inside the output gear and can drive the output gear to rotate;
   a second transmission mechanism, which includes a second driving gear coaxial with the first driving gear and fixedly connected to the first driving gear, and a second driven gear operatively connected to the second driving gear, the second driving gear can drive the second driven gear to rotate, the direction of rotation of the second driven gear is opposite to that of the first driven gear, the second driven gear is installed on the rotating bracket and is arranged outside the output gear, the second driven gear can drive the output gear to rotate; and
   an one-way control mechanism, the one-way control mechanism is configured to control the inner gear ring to rotate only one way, that is in the first rotation direction;
   wherein when the inner gear ring is fixed, the rotating bracket can be rotated; and when the inner gear ring can be rotated, the rotating bracket is fixed.

9. The antenna down-tilt control device as recited in claim 8, wherein the one-way control mechanism includes a one-way ratchet, and the one-way ratchet is fixed on the first mounting plate and is disposed on an outer side of the inner gear ring and is coaxially and rotationally connected with the same inner gear ring; and the one-way control mechanism further includes a stopper that can resume rotation, the stopper is fixed on the outer wall of the inner gear ring, and the stopper cooperates with the one-way ratchet so that the inner gear ring can only rotate in the first rotation direction.

10. The antenna down-tilt control device as recited in claim 9, wherein at least two stoppers are mounted on the outside of the inner gear ring in a rotatable manner.

11. The antenna down-tilt control device as recited in claim 7, wherein the rotating bracket is provided with a first cavity for mounting the first driving gear and the first driven gear, a second cavity for mounting the second driving gear and the second driven gear, and an annular wall spaced from the first cavity to form an annular groove, the arc-shaped embossment is disposed between the first cavity and the annular wall; the second cavity communicates with the first cavity and faces the arc-shaped embossment; and it also includes a cover that cooperates with the second cavity to form a receiving cavity of the second rotating component.

12. The antenna down-tilt control device as recited in claim 11, wherein the cover is provided with an annular body protruding outward, and the annular body is provided with a plurality of sensing portions; it also includes a second mounting plate, which is disposed facing the first mounting plate; the second mounting plate is provided with an annular concave body protruding outward that matches the annular body; an outer wall of the annular concave body is provided with a sensing element that senses the sensing portions.

13. The antenna down-tilt control device as recited in claim 12, wherein the first mounting plate is fixedly connected to the second mounting plate; the first mounting plate is recessed inward to form a first hollow cavity, and the second mounting plate is recessed inward to form a second hollow cavity; and the second hollow cavity cooperates with the first hollow cavity to form a protective cavity.

* * * * *